Figure 1:
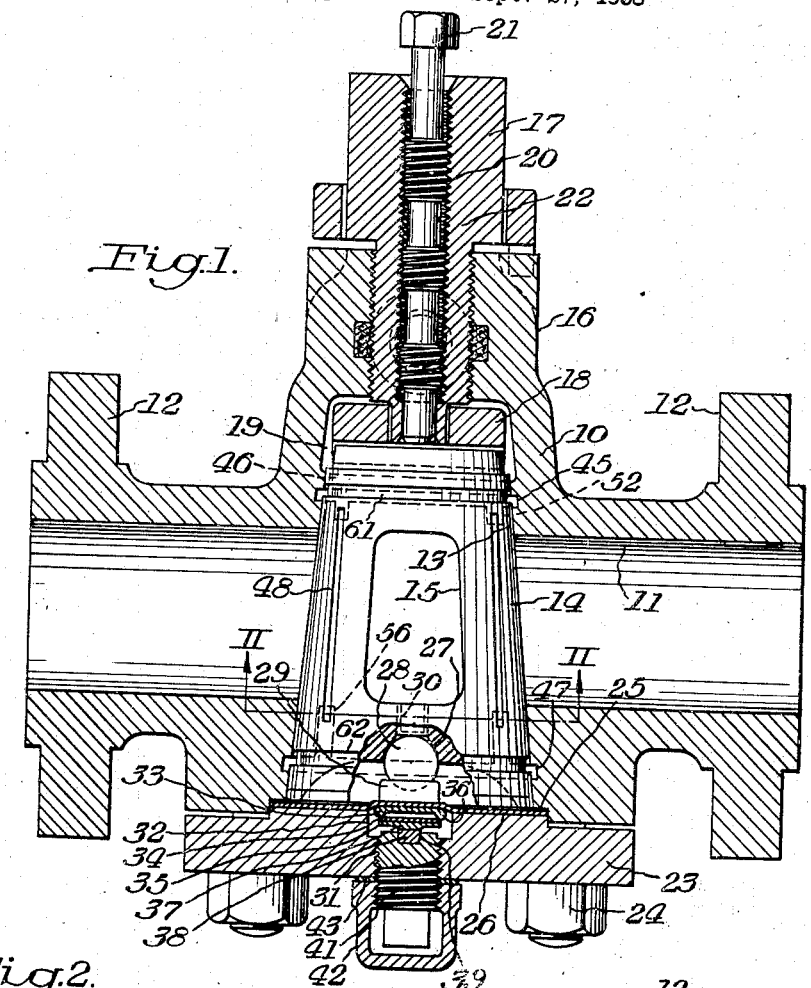

April 28, 1942.  S. J. NORDSTROM  2,280,925

HIGH TEMPERATURE VALVE

Original Filed Sept. 27, 1938

INVENTOR
Sven J. Nordstrom
BY
Lewis D. Kingsford

Patented Apr. 28, 1942

2,280,925

UNITED STATES PATENT OFFICE 2,280,925

HIGH TEMPERATURE VALVE

Sven J. Nordstrom, Lafayette, Calif., assignor to Merco Nordstrom Valve Company, Pittsburgh, Pa., a corporation of Delaware Original application September 27, 1938, Serial No. 231,906, now Patent No. 2,255,182, dated September 9, 1941. Divided and this application October 21, 1940, Serial No. 362,025

2 Claims. (Cl. 251—112)

This invention relates generally to valves, in particular to valves of the plug type. This is a division of my application filed September 27, 1938 for High temperature valve, Serial No. 231,906, Patent No. 2,255,182, granted Sept. 9, 1941.

It is an object of the present invention to provide an improved valve plug seating means for resiliently holding the plug against its seat which will not lose its resiliency when subject to high temperatures or upon repeated deflection.

A further object is the provision of resilient means having great rigidity for holding the plug against its seat which is protected from the corrosive and deteriorating action of the fluids passing through the valve.

A further object is the provision of a lubricated plug valve having a non-locking tapered plug and seat whereby the tendency of the valve to stick is obviated.

Still another object is the provision of an improved valve plug seating means for resiliently maintaining the valve plug on its seat and adjusting the seating pressure thereof which is compact in construction so that it may be applied to valves of small sizes, and which is inexpensive to manufacture.

In accordance with the present invention, I provide a lubricated plug valve having a separate operating stem which is separately sealed, and at one end of the plug I provide resilient thrusting means comprising a plurality of spring metal disks or plates arranged so that they may be deformed to transmit a resilient thrust to the plug. The washers preferably are located in a recess in the valve cover closing the end of the plug seat and are sealed with respect to line fluid by a flexible corrosion resisting metal diaphragm of suitable construction, the resilient thrust being transmitted through the diaphragm to the valve plug in any suitable manner. I prefer to transmit the thrust by means of a thrust button located on the opposite side of the sealing diaphragm and a ball interposed between the thrust button and the plug whereby frictional resistance to turning is reduced and there is no tendency of the button to rotate. The deformable washers and the thrust button preferably have flat faces engaging the diaphragm to avoid localized wear or danger of perforating the diaphragm. The resilient thrust of the washers preferably is adjusted by a threaded plug extending through the cover and abutting the washers so that by turning the plug in one direction the washers are deformed and by turning the plug in the reverse direction the washers tend to resume their original form.

The preferred form of washer has a substantially flat surface abutting the sealing diaphragm and has a peripheral raised rib on the other surface against which a flat washer abuts, the deflecting thrust of the threaded plug being exerted against the flat washer to bow it at its center. However, any desired form of resilient washer may be employed. The angle of taper of the plug preferably is 12°, as it has been found that this angle is non-locking in a lubricated valve, that is, the plug does not tend to wedge itself into its seat when subject to temperature changes, and does not materially increase the difficulty of turning the valve.

Figure 2:
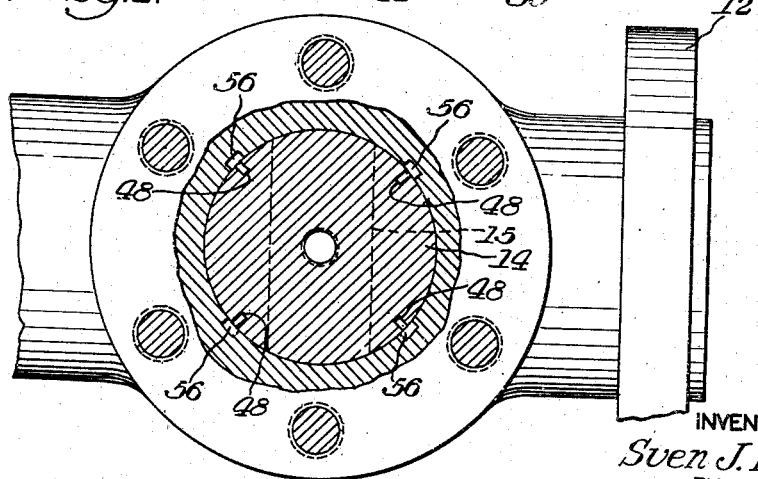

The invention will be described in greater detail in connection with the accompanying drawing wherein is shown by way of example a preferred modification of the invention and wherein:

Figure 1 is a vertical sectional view illustrating a valve incorporating the preferred embodiment of the present invention, and Figure 2 is a transverse section taken on line II—II of Figure 1.

Referring to the drawing, the valve comprises a body or casing 10 having a longitudinal passageway 11 therethrough for flow of fluid, said casing having flanges 12 adjacent the ends of the passageway whereby the valve may be connected into a fluid pipeline. A tapered bore or seat 13 is formed in the casing transversely of the passageway, and extends to the exterior of the casing at the larger end of the tapered bore. A tapered plug 14 is seated in the seat 13 and has a port 15 therethrough adapted to register with the passageway 11 in full open position of the valve. Preferably the taper of the plug and seat is 12°, that is, the wall makes an angle of 6° with the axis of the plug on each side.

At the smaller end of the valve seat the casing 10 has an extension 16 into which is threaded an operating stem 17 which is separate from the plug and forms an operative connection therewith at the smaller end of the plug through a modified Oldham coupling 18 or the like. A lubricant chamber 19 is formed at the smaller end of the plug and lubricant is supplied thereto through a threaded bore 20 extending through the valve stem 17, the lubricant in bore 20 and chamber 19 being placed under compression by means of a screw 21 threaded into the bore 20. One or more check valves 22 of suitable construction are provided in the bore 20 to prevent refluxing of the lubricant or escape of line fluid.

The larger end of the tapered seat 13 communicates with the exterior and is closed by a cover 23 which is secured thereto in any suitable manner, as for example, by the studs and nuts 25 threaded thereon. Shoulder 25 surrounds the larger end of the seat 13, and a diaphragm 26 has its periphery clamped between the shoulder 25 of the casing and the cover 23. The diaphragm 26 preferably is made of a stainless steel or other suitable corrosion resisting material and is sufficiently thin so that it may be flexed. The cover 23 may be made of cast steel or die-forged steel or of any other suitable material, and preferably is constructed thick enough so that it will not be appreciably flexed by the line pressure or the reaction of the seating thrust on the plug. A conical recess 27 is formed in the larger end of the plug and receives a ball 28 which is made of hard steel or other suitable material, and a thrust button 29 is interposed between the bore 27 and the diaphragm 26 for transmitting the seating thrust to the plug. The plug thus may be turned without turning thrust button 28. Preferably there is a hole 30 connecting the port of the plug with the space at the larger end of the seat.

The cover 23 has a central threaded bore 31 therein which is counterbored at 32 and receives in the counterbore a plurality of thrust members 33, 34 and 35. The member 33 preferably has a flat surface engaging the diaphragm 36, and has a peripheral bead 36 on its opposite surface. The washer 34 preferably is flat and its periphery rests upon the bead 36 of washer 33, the center portion of washer 34 being without support so that the washer may flex in its center when pressure is exerted thereon. If desired, a third disk 35 may be provided having a thickened central portion 37, and a pin 38 engages the center portion of disk 35 and is received in a central recess 39 formed in the inner end of threaded plug 41. The washers or disks 34 and 35 preferably are formed of spring steel or other resilient metal so as to have the desired resiliency and strength. The threaded plug 41 may be locked in position by means of an internally threaded cap 42 which abuts a sealing gasket 43 and prevents leakage should the diaphragm 26 be accidentally ruptured. If desired, the cap 42 may be spot welded to the cover.

The preferred lubricating system for the valve comprises a circumferential groove 45 in the casing in the smaller end of the seat, which communicates at all times with the chamber 19 by means of short connecting grooves 46. A circumferential groove 47 is formed at the larger end of the seat. The plug 14 has four longitudinal grooves 48 which are disposed diametrically opposite in pairs and on opposite sides of the port 15, and four extensions 52 of the circumferential groove 45 communicate with the longitudinal grooves 48 in full open and full closed positions only of the valve plug. At the opposite end, the circumferential groove 47 has extensions 56, which likewise communicate with the longitudinal grooves 48 in full open and full closed positions only of the plug. If desired, circumferential grooves 61 and 62 may be provided at opposite ends of the plug and opposite the circumferential grooves 46 and 47 in the casing in order to enable the plug to be lapped into its seat without raising a ridge on the seating surface.

The operation of the valve will now be described. In order to lubricate the valve, a quantity of lubricant, preferably in stick form, is inserted in the threaded bore 20 and is forced by screw 21 through the bore 20 into the chamber 19 and by connecting grooves 46 into the overlapping circumferential grooves 61 and 45. By means of the short connecting grooves 52 lubricant is conducted into the longitudinal grooves 48 and by means of the connecting grooves 56 lubricant is conducted from longitudinal grooves 48 into the overlapping circumferential grooves 62 and 47. In closed and opened positions of the valve the passageway 11 is surrounded at both ends by closed circuit of lubricant grooves, and in intermediate positions the grooves 48 are all disconnected from the source of lubricant under pressure in chamber 19.

By reason of the foregoing arrangement of lubricant grooves, the valve can be moved longitudinally against the resilient force of washers 33, 34 and 35 in any position of the plug. In positions where any of the longitudinal grooves 48 are exposed to line fluid, as for example, when the valve is rotated between open and closed positions, these grooves are not in communication with the source of lubricant pressure which is chamber 19, nor the circumferential grooves 62 and 47 at the larger end of the plug. Consequently the lubricant will not be washed out of the lubricant system for the valve when the plug is left with any of the grooves therein exposed.

The seating thrust on the plug may be adjusted by adjustment of threaded plug 41. When the plug 41 is turned inward it forces pin 39 against washers 34 and 35 at their center, causing them to be bowed or deflected, the peripheries being free to allow such action. The resilient thrust of the peripheries of these washers is transmitted through the rib 36 and diaphragm 26 against the thrust button 29, which in turn transmits the seating thrust to the plug through the thrust ball 28. When it is desired to relieve the thrust on the plug the threaded plug 41 is turned outwardly, thus relieving the deforming force exerted on washers 34 and 35 so that pressure within the casing forces the plug toward the larger end as far as is permitted by the thrust transmitting means.

As the cover 23 requires bolt holes and therefore cannot be made of spring steel, this construction permits the use of strong spring steel washers 33, 34 and 35 for maintaining the plug on its seat, no machining being required in making the washers. If desired, the rib 36 may be separate from the washer 33.

The invention may be embodied in other specific forms without departing from the spirit or essential characteristics thereof, and the present preferred embodiment is, therefore, to be considered as illustrative rather than restrictive of the invention.

What I claim as my invention and desire to secure by United States Letters Patent is:

1. A valve comprising a casing having a passageway therethrough and a tapered valve seat formed transversely of the passageway, a cover having a central opening secured to the casing for closing the larger end of the seat, a tapered plug seated in the valve seat and having a hole adapted to register with the passageway, a separate operating stem passing through the casing in sealing relation thereto and engaging the smaller end of the plug, a sealing diaphragm interposed between the valve cover and the casing, a plate having a substantially flat surface engaging said diaphragm and having a raised periphery on the opposite side, inherently resilient spring metal washers in said central opening supported at their peripheries by the raised periphery of said plate, means on the opposite side of the diaphragm for transmitting the thrust of said washers against the plug, and means in the cover for deflecting said washers to force the plug into its seat.

2. A valve comprising a casing having a passageway therethrough and a tapered valve seat formed transversely of the passageway, a tapered plug seated in the valve seat and having a port adapted to register with the passageway, a cover having a central opening secured to the casing for closing the larger end of the valve seat, a sealing diaphragm clamped between the cover and the casing, a plate having a substantially flat surface engaging said diaphragm and having a raised periphery on the opposite side, a plurality of steel spring washers supported at their peripheries in said opening by the raised periphery of said plate, a threaded plug in said opening bearing on the centers of said washers and deforming said washers to force them against the diaphragm, and thrust transmitting means on the opposite side of the diaphragm for transmitting the thrust of the washers to the plug.

SVEN J. NORDSTROM.